United States Patent [19]
Adams

[11] 4,094,374
[45] * June 13, 1978

[54] TWO WHEELED ELECTRICALLY POWERED VEHICLE

[76] Inventor: Herbert Adams, 1036 San Carlos Rd., Pebble Beach, Calif. 93953

[*] Notice: The portion of the term of this patent subsequent to Jan. 27, 1993, has been disclaimed.

[21] Appl. No.: 631,843

[22] Filed: Nov. 13, 1975

Related U.S. Application Data

[63] Continuation of Ser. No. 500,389, Aug. 26, 1974, Pat. No. 3,934,669.

[51] Int. Cl.² .................... B62M 7/10; B62K 15/00
[52] U.S. Cl. ................................. 180/31; 180/34; 280/278
[58] Field of Search .............. 280/276, 278, 287, 37; 180/34, 31, 32, 33, 26 A, 26 R, 52, 65 R

[56] References Cited

U.S. PATENT DOCUMENTS

| | | | |
|---|---|---|---|
| 2,687,898 | 8/1954 | Schwinn | 280/276 |
| 2,910,130 | 10/1959 | Schlaphoff | 180/33 R |
| 2,942,679 | 6/1960 | Gibson | 180/65 R |
| 3,023,825 | 3/1962 | Rabjohn | 180/26 R |
| 3,099,326 | 7/1963 | Weigel et al. | 280/278 |
| 3,199,623 | 8/1965 | Mangum | 180/31 |
| 3,316,993 | 5/1967 | Weitzner | 280/278 |
| 3,380,546 | 4/1968 | Rabjohn | 180/65 R |
| 3,433,318 | 3/1969 | Packard | 180/31 |
| 3,794,132 | 2/1974 | Moon | 180/65 R |
| 3,934,669 | 1/1976 | Adams | 180/34 |

FOREIGN PATENT DOCUMENTS

| | | | |
|---|---|---|---|
| 713,672 | 9/1966 | Italy | 280/278 |

Primary Examiner—Kenneth H. Betts
Attorney, Agent, or Firm—Basile and Weintraub

[57] ABSTRACT

A two wheeled, electrically powered vehicle having an outer contour resembling a piece of luggage and including a handlebar controlled steering column which is retractable into the luggage shaped vehicle to facilitate the carrying of the vehicle. The steering column is connected to one of the wheels and is movable to facilitate the steering of the vehicle while, at the same time, an electrically powered motor mounted to the steering column provides the motive force for driving the steered wheel to propel the vehicle.

2 Claims, 7 Drawing Figures

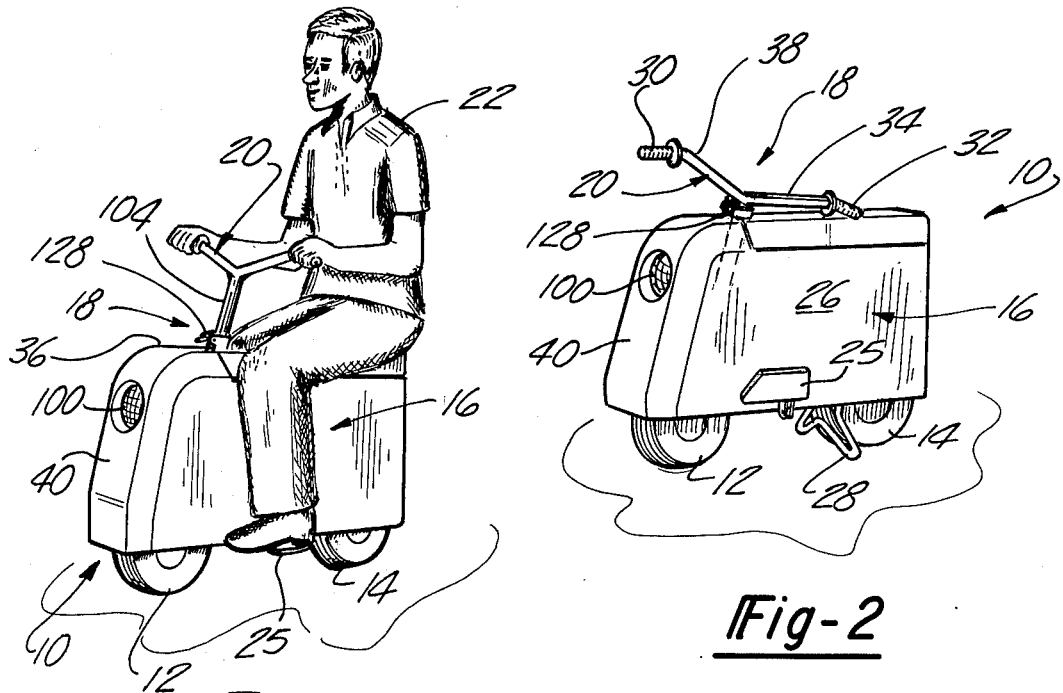
Fig-1
Fig-2
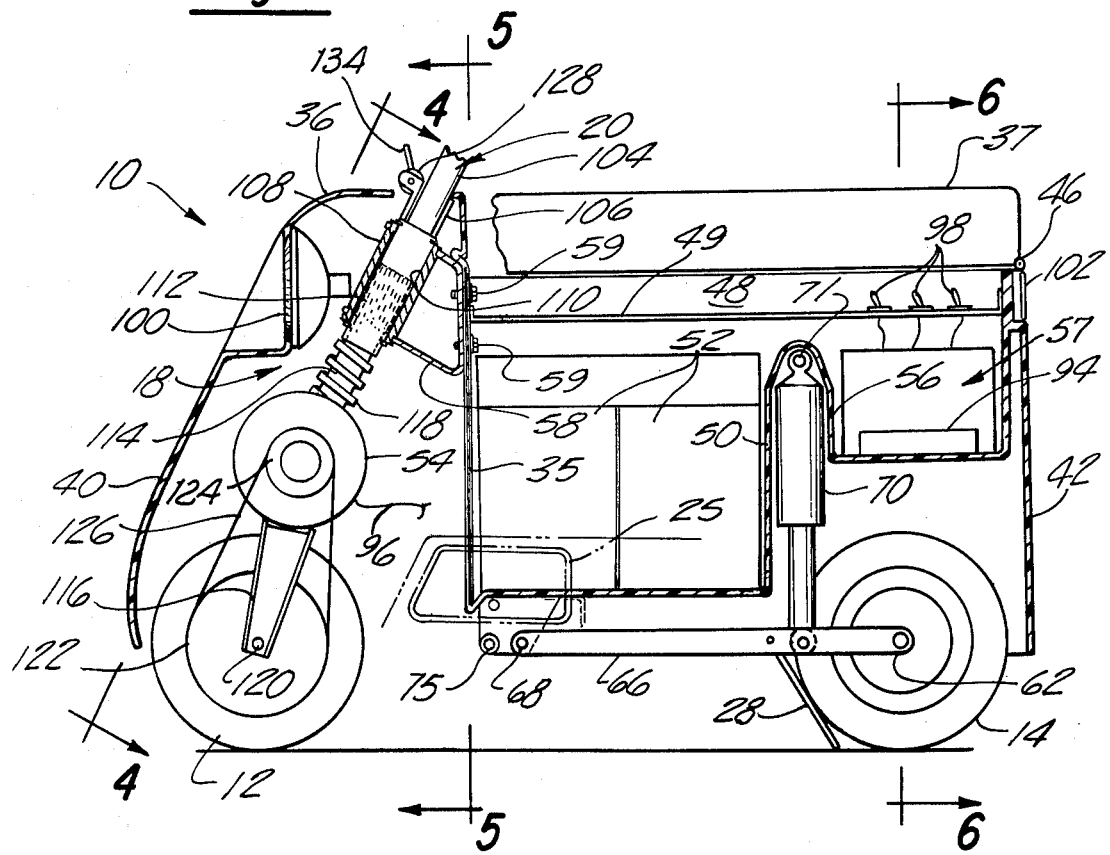
Fig-3

TWO WHEELED ELECTRICALLY POWERED VEHICLE

This is a continuation of application Ser. No. 500,389 filed Aug. 26, 1974, now U.S. Pat. No. 3,934,669.

The aforementioned abstract is not intended to define the invention as disclosed in the present application and as defined by the appended claims, nor is the abstract intended to be limiting as to the scope of the invention as defined hereinafter.

BACKGROUND OF THE INVENTION

I. Field of the Invention

The present invention relates generally to powered vehicles and, more particularly, to a low cost, two wheeled, electrically powered vehicle shaped to resemble a piece of luggage.

II. Description of the Prior Art

Heretofore, numerous two wheeled vehicles, such as motorcycles, scooters and the like have been known and examples of such known vehicles are disclosed in U.S. Pat. Nos. 2,910,130, 2,577,951, 3,079,172, 3,314,494, 3,354,976 3,483,937, 3,554,311, 3,605,929, and 3,710,883. While many of the vehicles disclosed in the aforementioned examples of prior art structures have achieved compactness of design, the vehicles in many instances must be of the type that permits a folding of the various components, or the vehicle must be completely dissassembled in order to be transported. In such arrangements, generally, the wheels and steering columns of the vehicles are disassembled and stored in a suitable compartment for transportation.

In almost all situations, the motorized vehicle is so designed that the vehicle cannot physically be carried and/or will not be permitted into a building or room for storage; such aforementioned vehicles must be stored in a parking lot or similar type of facility.

It would therefore be desirable to provide a powered vehicle that is capable of transporting at least one adult person on urban streets with the vehicle being so designed that it is completely contained within a frame that resembles, in appearance, a piece of luggage. It is also desirable to design such a powered vehicle that is light enough and simple enough in its construction that an adult may simply carry the same or roll it on one or both of its wheels when it is in an inoperative, immobile condition.

Such a feature would permit the use of a so designed vehicle to transport an adult, while at the same time, permit the user to take the vehicle into a building or room for storage and, thus, eliminate the aforementioned parking problems associated with the prior art vehicles.

SUMMARY OF THE INVENTION

The present invention which will be described in greater detail hereinafter comprises a powered vehicle of sufficient size to permit the transportation of an adult while being of such a size and shape as to resemble a conventional piece of luggage for easy transport of the vehicle when the same is not being driven.

It is therefore an object of the present invention to provide a new and improved powered vehicle.

It is also a further object of the present invention to provide such a power vehicle which is propelled by an electrically driven motor that is simple in its design and inexpensive to manufacture and maintain.

It is still another object of the present invention to provide a powered vehicle that is light weight in construction, attractive in appearance, strong and durable, and which is capable of being produced at a relatively low cost.

Other objects, advantages and applications of the present invention will become apparent to those skilled in the art of powered vehicles when the accompanying description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts and components throughout the several views, and in which:

FIG. 1 is a perspective view of a powered vehicle constructed in accordance with the principles of the present invention and illustrated as transporting an adult.

FIG. 2 is a perspective view of the power vehicle illustrated in FIG. 1 with the handlebar assembly in position to permit the manual transportation of the powered vehicle;

FIG. 3 is a longitudinal cross-sectional view of the powered vehicle illustrated in FIGS. 1 and 2;

DESCRIPTION OF THE PREFERRED EMBODIMENT

Figure 4:
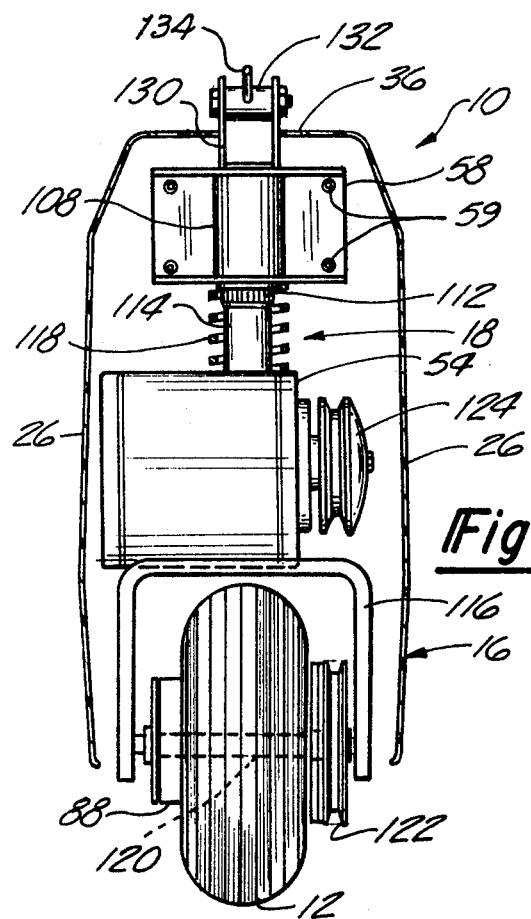
FIG. 4 is a fragmentary cross-sectional view of the powered vehicle taken along line 4—4 of FIG. 3.

Referring now to the drawings and, in particular, to FIGS. 1 and 2 wherein there is illustrated an example of the present invention in the form of a powered vehicle 10 having a pair of longitudinally spaced wheels 12 and 14 which support the frame 16 of the vehicle 10. The vehicle 10 further comprises a steering column assembly 18 which includes a removable handlebar 20 that is utilized by the driver 22 to steer the front wheel 12 and, thus, to control the direction of movement of the vehicle 10 as the same is propelled in a manner that will be described hereinafter. The vehicle 10 further comprises a pair of foldable foot pedals 24 and 25 (FIG. 5) which are disposed on the opposite side of the vehicle 10 for the purpose of accomodating the driver's feet as illustrated in FIG. 1. When not in use, the foldable foot pedals 24 and 25 are positioned in recesses 27 on the opposite sides 26 of the vehicle 10 as shown in the FIGS. 2 and 5.

The vehicle further includes a kickstand 28 (FIGS. 2 and 3) for purposes of maintaining the vehicle 10 in an upright position when the vehicle 10 is not in use. It should be noted that the kickstand 28 is movable from an upright position where the kickstand 28 is disposed in a horizontal position and the vehicle 10 may be driven to a downward position (FIG. 3) wherein the kickstand 28 supports the vehicle 10 in an upright position while abutting the tire of the rear wheel 14 to function as a parking brake.

The handlebar 20 is removable from the vehicle and may be reinserted into the vehicle 10 in a raised position (FIG. 1), as will be described in greater detail hereinafter, in which position the handlebar 20 is grasp by the driver 22 to steer the vehicle 10 in a conventional manner. The handlebar 20 may be removed from the vehicle 10 and reinserted in a lowered position, as shown in FIG. 2, wherein the hand grips 30 and 32 are pointed toward the forward and rearward sections, respectfully, of the powered vehicle 10, such that the handlebar 20 itself generally lies in the longitudinal plane of the powered vehicle 10. Still referring to FIG. 2, it can be seen that when the handlebar 20 is repositioned in this manner, the handlebar section 34 that is associated with the rearwardly directed handlebar grip 32 is raised slightly above the top surface 36 of the vehicle to permit the driver 22 to grasp the bar section 34 to lift and carry the powdered vehicle 10 in the same manner as one would grasp a handle of a piece of luggage. The portion 38 of the handlebar 20 associated with the forwardly directed handlebar grip 30 extends upwardly and outwardly with respect to the top of the powdered vehicle 10, such that the grip 30 may be grasped by the user to raise the front end of the vehicle 10 to lift the wheel 12 off the ground. This permits the user to push the vehicle 10 rearwardly while the vehicle 10 is supported by and rides on the rear wheel 14, and thus, provides a very simple and convenient means for the driver 22 to move the vehicle 10 when it is not possible to drive the vehicle, such as within a building.

It can be envisioned that after the driver 22 has reached his designation by driving the vehicle 10 in the street, he may lower the handlebar 18 in a manner to be described such that he may grasp the grip 30 and transport the powered vehicle 10 along the sidewall or into a building, as desired. When it is necessary to lift the vehicle 10, such as when walking upstairs, the driver 22 may grasp the handlebar portion 34 in the aforementioned manner as one would grasp a suitcase handle and thereby carry the powered vehicle 10. The same situation would apply to the placement of the vehicle 10 in a conventional transportation vehicle such as a car or a bus or the like.

Referring now to FIGS. 2 through 7 for a more detailed description of the powered vehicle 10, it can be seen that the frame 16 may be fabricated from any suitable material and preferably from a one piece plastic casting having a metal insert 35, such as an aluminum insert, to reinforce the steering column 20 of the vehicle 10 as will be described hereinafter. In addition to the aforementioned opposite sides 26, the frame 16 has a top 36, an inclined front section 40 and a rear section 42, all of which, as aforementioned, are preferably of an integral one piece plastic construction. The vehicle 10 has a seat 37 to accomodate the driver 22, and the rear edge of the seat 37 is attached to the upper edge of the rear section 42 of the frame 16 by means of a hinge like connection 46. The seat 37 may be raised by pivoting the same about the hinge 46 to permit access to the interior of the frame 16 wherein the same forms a storage compartment 48, the floor 49 of which is removable for access to two lower compartments 50 and 56.

The forward compartment 50 preferably houses one or more electric batteries 52 which supply the necessary electric power for driving an electric motor 54 as will be described hereinafter. The rearward portion of the frame 16 defines the second compartment 56 which preferably functions as a storage area for a battery charger and other necessary electrical control elements such as switches, fuses and the like, all of which are indicated by the number 57. It can be seen that the easy access to the compartments 48, 50 and 56 can be had simply by raising the seat 37 and removing the floor 49. The forward end of the frame wall and insert 35 defined by compartment 50 also mounts the steering column bracket 58. The bracket 58 is attached to the frame wall and insert 35 by fasteners 59 extending through suitable bores for attachment to nuts, or the like.

Figure 5:
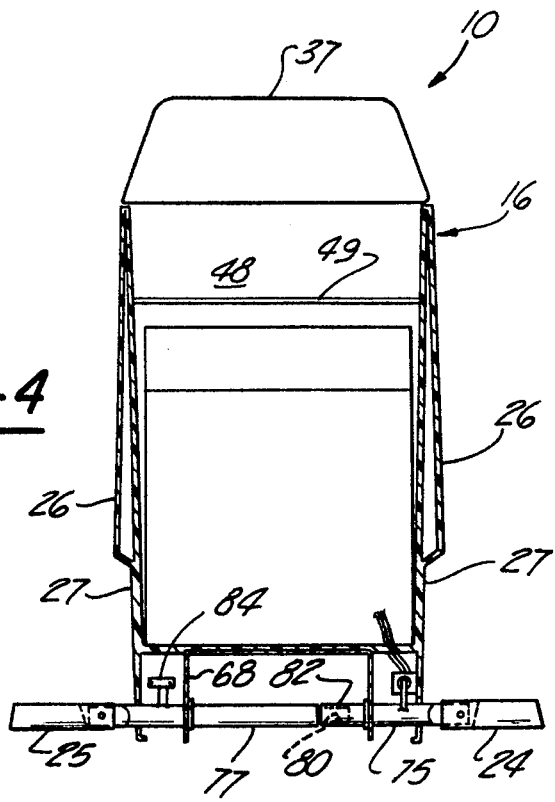
FIG. 5 is a fragmentary cross-sectional view of the powered vehicle taken along line 5—5 of FIG. 3.
Figure 6:
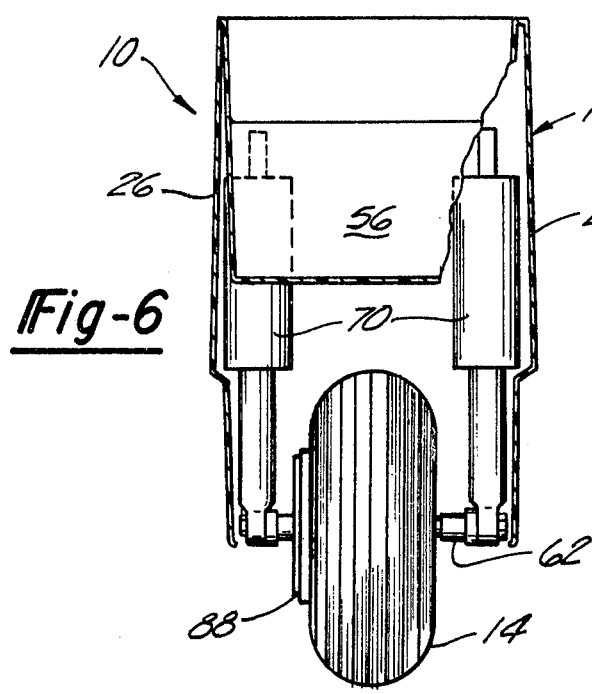
FIG. 6 is a fragmentary cross-sectional view of the powered vehicle with the seat section removed and taken along line 6—6 of FIG. 3.

As can best be seen in FIG. 3 and 6, the rear wheel 14, which may be conventional in construction, is rotatably mounted on an axle 62, the opposite ends of which are carried by the extended ends of a pair of control bars 66 which, in turn, are mounted to the opposite sides of a U-shaped bracket 68 (FIGS. 3 and 5). Intermediate the opposite ends of each of the control bars 66, shock absorbers and spring assemblies 70 are mounted in a conventional manner to afford the driver 22 of the vehicle 10 a smooth suspension. The upper ends of the shock absorber and spring assemblies 70 are attached to the frame 16 at 71 (FIG. 3) by any suitable fastening means.

Figure 7:
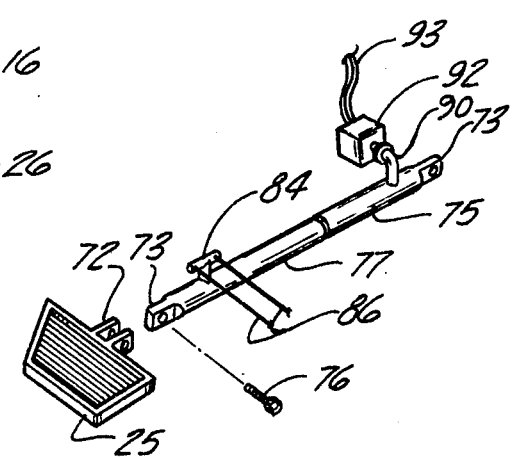
FIG. 7 is a fragmentary perspective view of the foot pedal assembly illustrated in FIG. 2.

As can best be seen in FIGS. 5 and 7, the foot pedals 24 and 25 are preferably of a metal construction having end flanges 72 which receive the reduced end sections 73 of support bars 75 and 77, respectively, and through which elongated hinge members such as pins 76 extend.

This arrangement provides a simple means for pivotally attaching the foot pedals 24 and 25 to the opposite sides 26 of the vehicle 10 such that the foot pedals 24 and 25 may be moved from the position shown in FIG. 2, that is, from an upright or vertical position when the vehicle 10 is not being driven to the lowered or horizontally disposed position such as shown in FIG. 1, when it is desired to provide support for the driver's feet.

Still referring to FIGS. 5 and 7, it can be seen that the support bars 75 and 77 are rotatably carried by the aforementioned U-shaped bracket 68 which is, in turn, fastened to the underside of the wall of the frame 16 that defines the compartment 50. The support bar 75 has an axial bore 80 (FIG. 5) which rotatably receives a reduced diametered end 82 of the support bar 77 such that the supports bar 75 and 77 support each other while being able to rotate relative to each other. The support bar 77 which is attached to the left end pedal 25 carries a T-shaped flange 84 to which is attached brake wires 86 which, in turn, are connected to front and rear commercially available mechanical brake assemblies 88. It can thus be seen that when the driver 22 exerts a downwardly directed force on the brake pedal 25, and the same is rotated forwardly, that is counter clockwise in FIG. 2, the mechanical brake assemblies 88 will be actuated to stop the motion of the vehicle 10.

The support bar 75 attached to the foot pedal 24 carries an L-shaped member 90 which terminates in an on-off switch 92 which, in turn, is electrically connected by wires 93 to a solenoid 94 located within compartment 56. The electrical switch 92 is actuated to an "on" position when the foot or drive pedal 24 is rotated forwardly and the switch 92 is moved to the "off" position when the drive pedal 24 is rotated in the opposite direction. The solenoid 94 (FIG. 3) is adapted to electrically connect the batteries 52 to the electrical motor 54 via wire 96 and suitable switches not shown. Switches 98 carried on the floor 49 are adapted to function as a main switch to turn the entire system on and off, as desired, and to operate headlight 100 carried by the front section 40 and tail light 102 carried by the rear section 42. The various switches and electrical components utilized in the vehicle 10 are all connected by suitable wiring, all of which is known to those skilled in the art of electrical devices and the like.

Referring now to FIGS. 3 and 4, the steering column assembly 18 is illustrated as comprising a tubular member 104 having a square cross-section which terminates at its upper end in the handlebar 20. The handlebar 20 may be attached to the upper end of the tubular member 104 by any suitable fastening means (not shown) such as by welding, or the two components may be of an integral construction. As can be seen in FIG. 3, the lower portion of the tubular member 104 is slidably received into a complementary shaped collar member 106, the lower portion of which is mounted in a bushing 108 such that the collar member 106 is free for rotational movement about the longitudinal axis defined by the bushing 108. The bushing 108 is, in turn, fixedly secured to the frame 16 by means of the aforementioned bracket 58 (FIG. 3).

The interior wall surface of the collar member defines a female spline 110 which mates with and slidably engages the male spline 112 formed in the upper end of a support post 114.

The lower end of the support post 114 is attached by any suitable means, such as welding or the like, to the outer peripheral surface of the electric motor 54 which, in turn, has its lower peripheral surface seated on and fixedly secured to the base of an angled member, such as a U-shaped fork element 116. A coil spring 118 disposed around the support post 114 between the motor 54 and collar member 106 functions as a shock absorber since the support post is movable up and down with respect to the collar member 106 due to the sliding relationship of the splines 110 and 112. The extended ends of the legs of the fork element 116 rotatably support an axle 120 which, in turn, supports a driven pulley 122 and the front wheel 12. The mechanical output of the electric motor 54 is connected to the driven pulley 122 by means of a drive pulley 124 and a suitable drive belt 126 (FIG. 3), such that the front wheel 12 is driven by the electric motor 54. In the preferred embodiment the pulleys 122 and 124 and the drive belt 126 form the components of a variable ratio-belt drive which is standard in construction and commercially available. The most economical and efficient operation may be obtained by this arrangement when electric energy transmitted from the battery 52 to the electric motor transmission 54 is utilized to drive the front wheel 12.

The handlebar 20 and the tubular member 104 are so arranged as to be movable from the raised position, as aforementioned and shown in FIG. 1, to a lowered position as shown in FIG. 2. This is accomplished by means of an over center locking mechanism 128 which is carried at the front end of the tubular member 106 and as can best be seen in FIGS. 2 and 4, comprises a pair of outwardly disposed brackets 130 which rotatably support therebetween, a circular cam member 132 which is moved by a lever 134. Thus, to maintain the handlebar 20 in the raised position, the lever 134 is used to rotate the cam member 132 (clockwise as viewed in FIG. 2) into engagement with the forward force of the tubular member 104 and lock the same in position. Rotation of the cam member 132 in an opposite direction permits a complete withdrawal of the handlebar 20 from the square shaped tubular member 106. After withdrawal, the handlebar 20 is rotated 90° and the end tubular member 104 of the handlebar 20 is reinserted within the square opening in the tubular member 106. The handlebar 20 is lowered to the position illustrated in FIG. 2, locked in position by the cam member 132; the vehicle 10 may then be moved in the aforementioned manner. In the raised position the engagement of the square complementary surfaces of the tubular member 104 and 106 secures these members such that rotation of the handlebars 20 about the longitudinal axis of the steering column 18 will rotate the wheel 12 so as to steer the vehicle 10. In the lowered position the engagement of the square complementary surfaces of the tubular members 104 and 106 maintains handlebar assembly 20 in the rotated position as illustrated in FIG. 2, to enable the driver 22 to selectively carry or push the vehicle 10 on one or both wheels in the aforementioned manner.

In should be noted that the tubular members 104 and 106 may be either mechanically or electrically keyed to the motor 54 such that complete removal of the handlebar will minimize the possibility of a theft.

It can thus be seen that the present invention provides a unique powered vehicle having numerous advantages that are not disclosed in the prior art, and which may be utilized as a transportation system having many applications. Because of its unique shape and one piece molded body, the inventive powered vehicle may be brought into a building and stored therein. Examples of typical applications for the present invention include, but are not limited to, the use of the vehicle in shopping centers having limited parking facilities; the use of the vehicle by students who may not or cannot leave their vehicles unattended because of possibility of theft; by commuters between their homes and a common carrier such as a bus or train where upon the vehicle may be carried onto the bus or other common carriers for transportation to the ultimate destination of the driver. Similarly, it is anticipated that the vehicle will be of invaluable use to; residents who live in congested urban areas where it is impractical to own other types of transportation and where and an owner may store the vehicle within a home or apartment during the evening for theft prevention purposes.

It should also be noted that because of the new one piece molded body construction that functions both as a frame and structure, the attractive vehicle is extremely strong, rugged, but inexpensive to fabricate in large quantities.

Although only one form of the present invention has been disclosed, it should be apparent to those skilled in the art of powered vehicles that other forms may be had all coming within the spirit of the present invention and the scope of the appended claims.

What is claimed is as follows:

1. A powered vehicle comprising:
   an integrally formed body frame bounded by a top wall, a front wall, a rear wall, and side walls;
   a pair of wheels protruding from the bottom of said frame for supporting said frame;
   a steering column having a lower portion rotatably carried by said frame, said lower portion of said steering column being coupled to one of said wheels to facilitate the steering of said vehicle when said steering column is rotated with respect to said frame;
   an upper portion of said steering column being longitudinally slidably received in said lower portion and movable between a raised position and a lowered position;

lock means for releasably securing said upper portion to said lower portion when in said raised position, such that said upper portion of said steering column is rotatable with said lower portion when said upper portion is in said raised position and releasably secured with said lower portion;

handlebar means carried by said upper portion of said steering column, said handlebar means having opposite projecting ends extending from said upper portion, said handlebar means being movable with said upper portion relative to said steering column lower portion wherein said handlebar means extends transversely with respect to the longitudinal axes of said frame, said handlebar means being movable with said upper portion relative to said lower portion to said lowered position such that said handlebar means is disposed in a front-to-rear fashion, said handlebar means being sized that one end of said handlebar means is in close proximity to said top wall of said frame while the portion of said handlebar means between said one end and said upper portion of said steering column is located near the mid-section of said frame, said lock means releasably securing said upper portion to said lower portion when same is in said lower position; and the other end of said handlebar means projecting outwardly from said front wall of said vehicle, whereby when said handlebar means is in said front-to-rear lower position, said one end of said handlebar means serving as a means for lifting and carrying said vehicle, said other end of said handlebar means serving to facilitate the manual propelling of said vehicle on at least one of said wheels.

2. An electrically powered vehicle comprising:

an integrally formed body frame;

a plurality of wheels supporting said frame including a front driven wheel;

a steering column carried by said frame having an upper and a lower portion;

an electric motor forming a portion of said steering column;

an angled member having a base and means for mounting an axle on which said driven wheel is rotatably mounted and supported, said base of said member mounting said electric motor;

means connecting the mechanical output of said electric motor to said wheel to drive the same; and means fixedly attaching one end of said lower portion of said steering column to said electric motor such that said front driven wheel, said angled member, said electric motor, and said lower portion of said steering column are successively connected to unitedly form one member adapted to facilitate the steering of said electrically driven wheel.

* * * * *

UNITED STATES PATENT AND TRADEMARK OFFICE
CERTIFICATE OF CORRECTION

PATENT NO. : 4,094,374
DATED : June 13, 1978
INVENTOR(S) : Herbert L. Adams

It is certified that error appears in the above-identified patent and that said Letters Patent are hereby corrected as shown below:

Column 3, line 33, following "handlebar" please delete "18" and insert --20--;

Column 3, line 49, following "column" please delete "20" and insert --18--;

Column 6, line 38, delete the -- ; -- after "to"

Signed and Sealed this

Seventeenth Day of April 1979

[SEAL]

Attest:

RUTH C. MASON
Attesting Officer

DONALD W. BANNER
Commissioner of Patents and Trademarks